(12) United States Patent
Xu et al.

(10) Patent No.: US 11,557,813 B2
(45) Date of Patent: Jan. 17, 2023

(54) SYSTEM AND METHOD FOR SEPARATING BATTERY COMPONENTS

(71) Applicant: ICREATE LIMITED, Hong Kong (CN)

(72) Inventors: Lingda Xu, Hong Kong (CN); Ka Yip Fung, Hong Kong (CN); Ka Ming Ng, Hong Kong (CN)

(73) Assignee: ICREATE LIMITED, Hong Kong (CN)

( * ) Notice: Subject to any disclaimer, the term of this patent is extended or adjusted under 35 U.S.C. 154(b) by 154 days.

(21) Appl. No.: 17/236,011

(22) Filed: Apr. 21, 2021

(65) Prior Publication Data
US 2022/0344773 A1   Oct. 27, 2022

(51) Int. Cl.
| H01M 50/46 | (2021.01) |
| H01M 10/54 | (2006.01) |
| H01M 50/691 | (2021.01) |
| H01M 50/411 | (2021.01) |
| H01M 50/449 | (2021.01) |
| H01M 50/403 | (2021.01) |

(52) U.S. Cl.
CPC ......... *H01M 50/411* (2021.01); *H01M 10/54* (2013.01); *H01M 50/403* (2021.01); *H01M 50/449* (2021.01); *H01M 50/46* (2021.01); *H01M 50/691* (2021.01)

(58) Field of Classification Search
CPC .. H01M 50/411; H01M 50/403; H01M 50/46; H01M 50/449; H01M 50/691; H01M 10/54
See application file for complete search history.

(56) References Cited

U.S. PATENT DOCUMENTS

| 5,972,531 A | * | 10/1999 | Kawakami | ............ H01M 10/54 429/49 |
| 10,680,295 B2 | | 6/2020 | Fung et al. | |
| 2019/0027794 A1 | * | 1/2019 | Fung | ....................... B02C 23/10 |
| 2022/0059909 A1 | * | 2/2022 | Lee | ..................... H01M 50/538 |

* cited by examiner

*Primary Examiner* — Christopher P Domone
*Assistant Examiner* — Kimberly Wyluda
(74) *Attorney, Agent, or Firm* — Nath, Goldberg & Meyer; Jerald L. Meyer

(57) ABSTRACT

A system and method for separating battery components provides for the separation of batteries into their individual layers of anodes, cathodes, first polymer separator layers, and second polymer separator layers. A battery casing of a battery is cut to uncover a battery cell core, which is then washed to remove an electrolyte therefrom. An outer wrapping layer of the washed battery cell core is cut to form an open loose end, and the open loose end is engaged by first and second rollers to unroll a laminate therefrom. The laminate includes a cathode layer, an anode layer, a first polymer separator layer, and a second polymer separator layer. The laminate is then separated into the cathode layer, the anode layer, the first polymer separator layer, and the second polymer separator layer with the first roller, the second roller, a third roller, and a fourth roller. Each layer is then collected.

20 Claims, 8 Drawing Sheets

SYSTEM AND METHOD FOR SEPARATING BATTERY COMPONENTS

BACKGROUND

1. Field

The disclosure of the present patent application relates to the recycling of batteries, such as conventional lithium ion rechargeable batteries, for example, and particularly to a system and method for separating such batteries into their individual case, cathode, anode and polymer separator layers.

2. Description of the Related Art

Batteries are found in all portable electronic devices. As an example, lithium ion batteries are a very common type of rechargeable battery. All lithium ion batteries contain a cathode layer, an anode layer, and a polymer separator, which is then protected by an outer shell. The most common configuration of a lithium ion battery is a rolled cell core, in which the cathode layer, the anode layer, and two layers of polymer separator are rolled up and put inside a case, which can be either a hard outer shell or a soft metal foil.

The disposal and recycling of lithium ion batteries is of considerable interest, since such batteries not only contain valuable materials, but also contain materials which are quite hazardous, both to human beings and the environment. Prior to any chemical recycling process, such as, for example, hydrometallurgical or pyrometallurgical processes, in order to extract the valuable materials from the batteries (e.g., cobalt, lithium, copper, etc.), the batteries must first be safely disassembled, and the various material components must be carefully separated. Following removal of the outer metal casing, the remaining components of the "cell core" must be separated into the cathode, the anode, and the polymer separator, and then recovered.

Conventional processes for breaking down cell cores typically involve breaking the cell core into small pieces, followed by extraction of the valuable metals from the resultant mixture. The separation process, however, is quite difficult, since the cathode and anode powders are mixed together. It would obviously be desirable to be able to easily unroll battery cell cores while keeping the cathode layer, anode layer and polymer separator layer separate from one another. Thus, a system and method for separating battery components solving the aforementioned problems is desired.

SUMMARY

The system for separating battery components includes at least one clamp for grasping a battery to be separated into its individual components. A loader, such as a ramp or the like, may be coupled to a battery holder, which is adapted for receiving and holding the battery, allowing the at least one clamp to grasp the battery when the battery is seated in the battery holder. A first cutter cuts a battery casing of the battery to uncover a battery cell core. In order to cut the battery casing, the at least one clamp and the battery may be held static, such that the cutter can rotate therearound, forming a circumferential slit through the battery casing. Alternatively, the cutter can be held static, and the at least one clamp and the battery can be rotated relative to the cutter in order to form the circumferential slit.

Once the battery casing is removed from the battery cell core, the battery cell core is transported to a washing reservoir, which is at least partially filled with a washing solution to remove an electrolyte from the battery cell core. The washed battery cell core is then removed from the washing reservoir and, while being transported to a cutting station, is dried. At the cutting station, a second cutter cuts an outer wrapping layer of the battery cell core to form an open loose end. A sheet opener is provided for engaging the open loose end of the battery cell core to unroll a laminate therefrom. The laminate is formed from a cathode layer, an anode layer, a first polymer separator layer, and a second polymer separator layer.

A plurality of rollers receive and selectively drive movement of the laminate. The plurality of rollers separate the laminate into the cathode layer, the anode layer, the first polymer separator layer, and the second polymer separator layer. It should be understood that any suitable arrangement and/or configurations of rollers may be used. As a non-limiting example, first and second rollers may receive and selectively drive movement of the laminate, and as the laminate passes through the first and second rollers, with the laminate being sandwiched therebetween, the first and second rollers separate the laminate into a first sub-laminate including the first polymer separator layer and the anode layer, and a second sub-laminate including the second polymer separator layer and the cathode layer. The first sub-laminate is then sandwiched between the first roller and a third roller for separating the first sub-laminate into the first polymer separator layer and the anode layer. The second sub-laminate is sandwiched between the second roller and a fourth roller for separating the second sub-laminate into the second polymer separator layer and the cathode layer.

In another non-limiting example, the first and second rollers may separate the laminate into the first polymer separator layer and an alternative first sub-laminate, which includes the anode layer, the second polymer separator layer and the cathode layer. The first sub-laminate in this alternative arrangement is sandwiched between the second roller and the third roller for separating the first sub-laminate into the anode layer and an alternative second sub-laminate, which includes the second polymer separator layer and the cathode layer. The second sub-laminate is then sandwiched between the second roller and the fourth roller for separating the second sub-laminate into the second polymer separator layer and the cathode layer.

In both exemplary arrangements, in order to perform the separation of layers, each of the first, second, third and fourth rollers may be formed as a hollow cylindrical housing having a plurality of apertures formed therethrough. Negative pressure or vacuum suction is applied within the hollow cylindrical housing, thus causing the layer of the laminate (or sub-laminate) adjacent the outer surface to be held thereagainst, peeling the closest layer from the remaining layer(s). The corresponding one of the cathode layer, the anode layer, the first polymer separator layer, and the second polymer separator layer may then be detached from the surface of the roller by at least partially blocking at least a portion of the plurality of apertures or by blowing a pressurized fluid through the plurality of apertures.

Following separation of the individual layers, the cathode layer, the anode layer, the first polymer separator layer, and the second polymer separator layer are collected, respectively, in a cathode layer collection box, an anode layer collection box, a first polymer separator layer collection box, and a second polymer separator layer collection box. Following separation by the vacuum rollers, each layer must be detached from its corresponding roller, thus, as a non-limiting example, each of the collection boxes may have a scraper or the like positioned adjacent thereto.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The system for separating battery components 100 is a multi-station system for separation of batteries, such as conventional lithium ion rechargeable batteries, as a non-limiting example, into their individual case, cathode, anode and polymer separator layers. It should be understood that system 100 can be applied to any type of lithium ion batteries in which a rolled cell core is protected by a case, including a hard outer shell or a soft metal foil. Further, it should be understood that system 100 can be used with any suitable type of cylindrical, cuboid or pouch batteries with rolled cell cores.

Figure 1A:
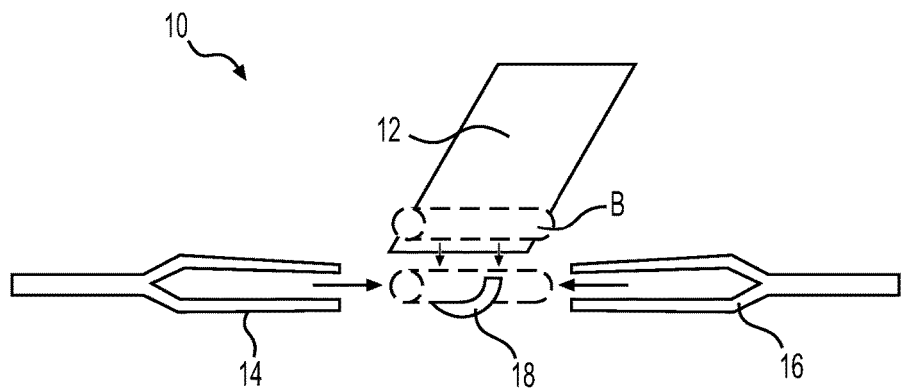
FIG. 1A, FIG. 1B, FIG. 1C, FIG. 1D, FIG. 1E, FIG. 1F and FIG. 1G diagrammatically illustrate removal of a battery casing at a battery casing removal station of a system for separating battery components.
Figure 1B:
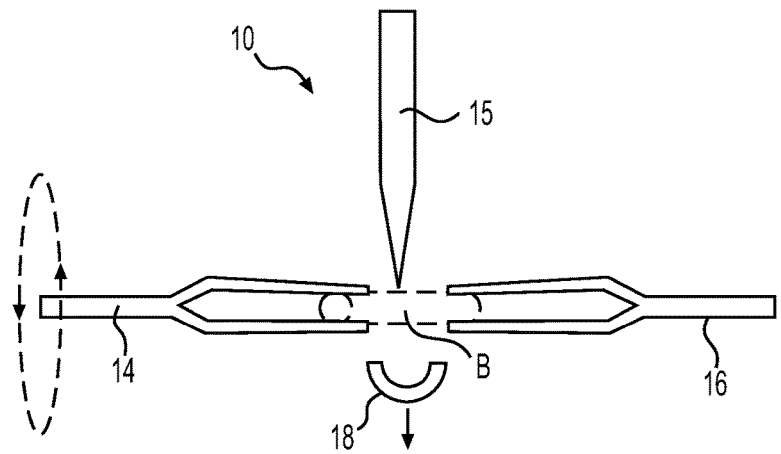
Figure 1C:
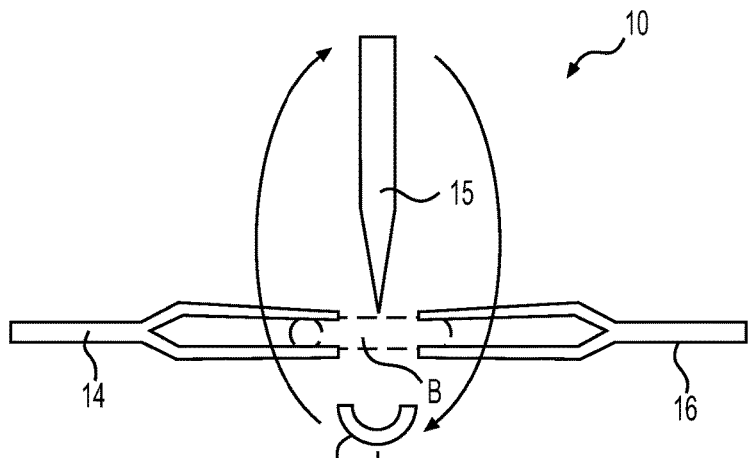

As shown in FIGS. 1A-1C, at an initial battery casing removal station 10, at least one clamp is provided for grasping a battery B to be separated into its individual components. In FIGS. 1A-1C, two such clamps 14, 16 are shown, although it should be understood that any suitable number of clamps may be used. Further, it should be understood that clamps 14, 16 are shown for exemplary purposes only, and that any suitable type of clamp or other grasping tool may be used. As a further non-limiting example, each of clamps 14, 16 may be a three-finger claw. As discussed above, it should be understood that system 100 may also be used with cuboid batteries. In such a case, clamps 14, 16 may be, as non-limiting examples, flat-plate clamps.

As shown in FIG. 1A, a loader 12, such as a ramp or the like, may be coupled to a battery holder 18, which is adapted for receiving and holding the battery B, allowing the clamps 14, 16 to grasp the battery B when the battery B is seated in the battery holder 18. It should be understood that ramp 12 and battery holder 18 are shown for exemplary purposes only, and that any suitable type of loading or inserting apparatus may be used, and that any suitable type of holder or seat may be used for receiving battery B.

Battery holder 18 may be mobile, allowing it to be moved into position when battery B is ready to be received thereby. It should be understood that battery holder 18 may have any suitable configuration, including, as non-limiting examples, clips, clamps, magnets, a vacuum, or combinations thereof. In FIG. 1A, battery B is shown being loaded into battery holder 18 by ramp 12, however, as noted above, system 100 may also be used with cuboid or pouch batteries. Thus, exemplary ramp 12 may be used for cylindrical batteries and, as a non-limiting example, a conveyor belt or the like may be used for cuboid or pouch batteries.

Since system 100 is intended for use with multiple batteries (i.e., rather than being a single-use system, system 100 may be used for the continuous recycling of batteries), prior to placing the batteries B on loader 12, the batteries B must all be arranged in the same direction (i.e., the cathode of each battery must face the same direction). This may be performed by a robotic arm or the like, coupled with an automated battery recognition and categorization system, which can be used to classify the batteries into different types and shapes.

Figure 1D:
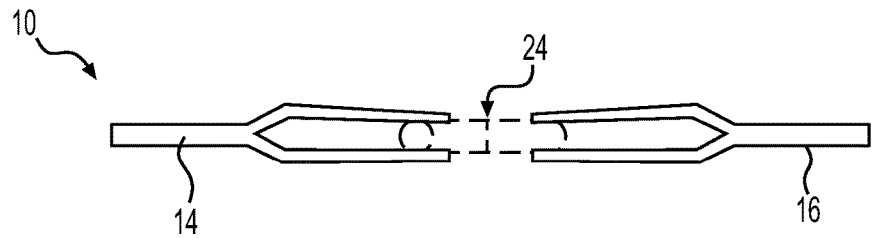

A first cutter 15 is moved into position, against the outer battery casing of the battery B, and forms a circumferential slit 24 through the outer battery casing, as shown in FIG. 1D. In order to cut the battery casing, the cutter 15 can be held static, and the clamps 14, 16 and the battery B can be rotated relative to the cutter 15 in order to form the circumferential slit 24, as shown in FIG. 1B. Additionally, as shown, once the battery B is firmly grasped by the clamps 14, 16, the battery holder 18 may be moved away. Alternatively, as shown in FIG. 1C, the clamps 14, 16 and the battery B may be held static, such that the cutter 15 can rotate therearound, forming the circumferential slit 24 through the battery casing. It should be understood that cutter 15 can be any suitable type of cutting tool. Non-limiting examples of such cutters include knives, laser cutters, needles, circular saws, serrated edges, water jets, electrical discharge machines, or combinations thereof. Once cutting is finished, cutter 15 may be moved away, back to a standby position. Further, although first cutter 15 is shown as a single cutting device, it should be understood that multiple cutters may be used.

Figure 1E:
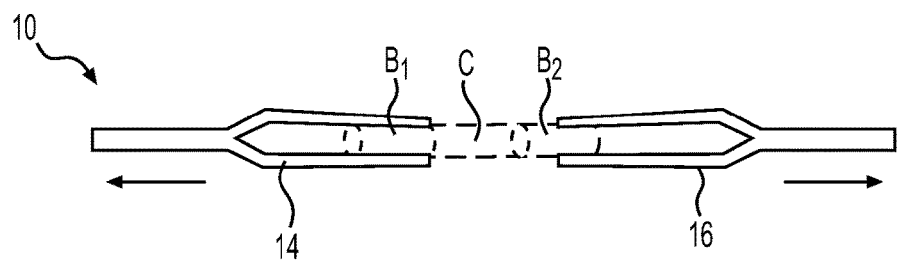
Figure 1F:
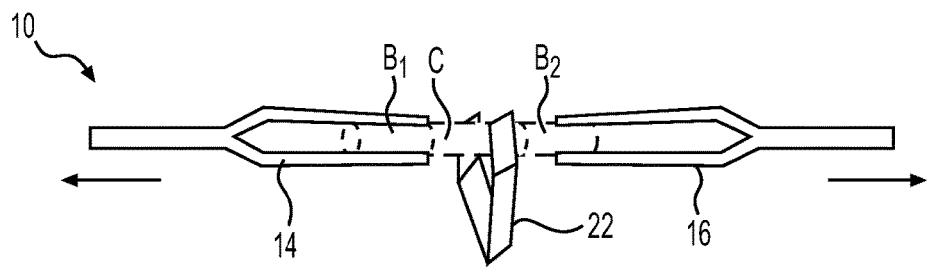
Figure 1G:
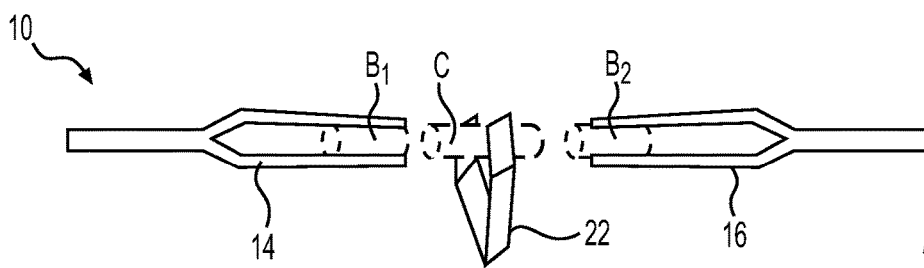

As shown in FIG. 1E, once the circumferential slit 24 is fully formed, dividing the battery casing into two halves $B_1$, $B_2$, the clamps 14, 16 can be moved axially (to the left and the right, respectively, in the orientation of FIG. 1E), to expose the battery cell core C. As shown in FIGS. 1F and 1G, once the battery cell core C is exposed, another clamp 22, grasping tool or the like can securely grip the battery cell core C, allowing the two halves $B_1$, $B_2$ to be fully removed therefrom. Clamps 14, 16 may release the two halves $B_1$, $B_2$ into a collection box containing water or the like to remove any remaining electrolyte therefrom. Clamps 14, 16 may then be moved back into the initial position of FIG. 1A to begin the process for the next battery.

In FIGS. 1A-1E, it should be understood that the operations described above, which take place at the battery casing removal station 10, may be performed in an isolated and enclosed housing, filled with inert gas, such as nitrogen, carbon dioxide, argon or the like, in order to prevent a rapid reaction between air and a battery electrolyte, which could lead to fire and/or explosion.

Figure 2A:
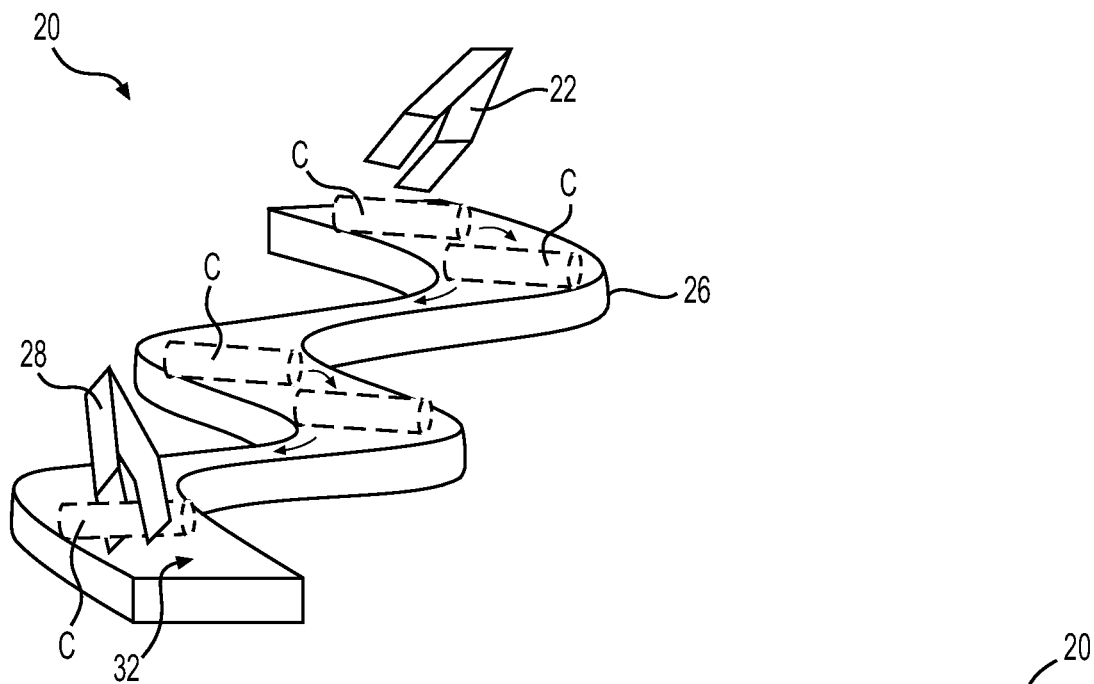
FIG. 2A diagrammatically illustrates washing of a battery cell core at a washing station of the system for separating battery components.

As shown in FIG. 2A, the clamp 22 can then transport the battery cell core C to a washing station 20, which includes a washing reservoir 26, which is at least partially filled with a washing solution 32 to remove an electrolyte from the battery cell core C. The washing solution 32 not only simply washes the battery cell core C, but also diffuses the electrolyte from the interior of the cell core C into the washing solution 32. Non-limiting examples of washing solutions include water, acid, alkali (e.g., NaOH) solution, aqueous salt solution, organic solvent (e.g., benzyl alcohol), and combinations thereof.

It should be understood that the wave-like slide configuration of washing reservoir 26 shown in FIG. 2A is shown for exemplary purposes only. The battery cell core C moves along the washing reservoir 26 to wash off the electrolyte on its surface, diffuse electrolyte from the interior of the cell core into the washing solution 32, and to dissolve any remaining glues, adhesives or the like. For the purpose of dissolving glue, an organic solvent may be used as the washing solution 32. The length of the washing reservoir 26 may be designed based on the required residence time of the battery cell core C in the washing solution 32. It should be understood that the battery cell core C may be moved along the washing reservoir 26 by any suitable technique. Non-limiting examples of such transport include movement caused by the flow of the washing solution 32, a conveyor belt in the washing reservoir 26, under the force of gravity, and the like. As a non-limiting example, battery cell core C may be held in washing solution 32 for approximately 15 minutes.

Figure 2B:
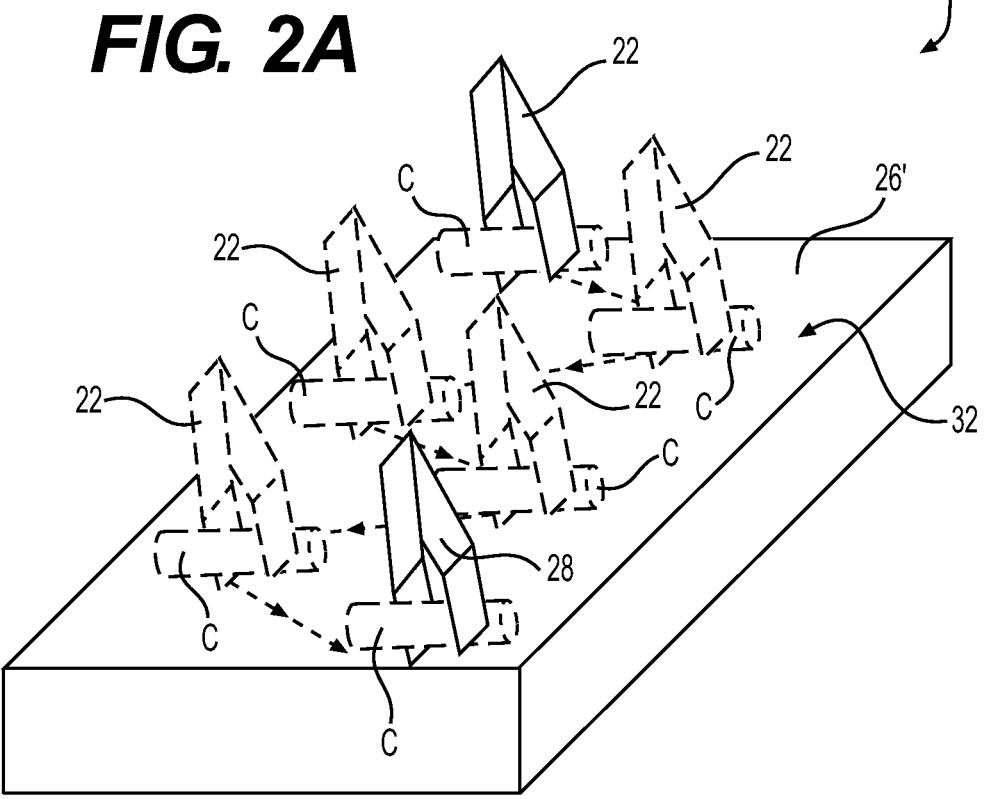
FIG. 2B diagrammatically illustrates an alternative embodiment of the washing station of FIG. 2A.

Alternatively, in the alternative configuration of FIG. 2B, the clamp 22, still holding the battery cell core C, may be immersed into the washing solution 32 held by washing reservoir 26'. In this alternative configuration, the clamp 22 carries the battery cell core C along a predetermined path within washing reservoir 26'.

Figure 3:
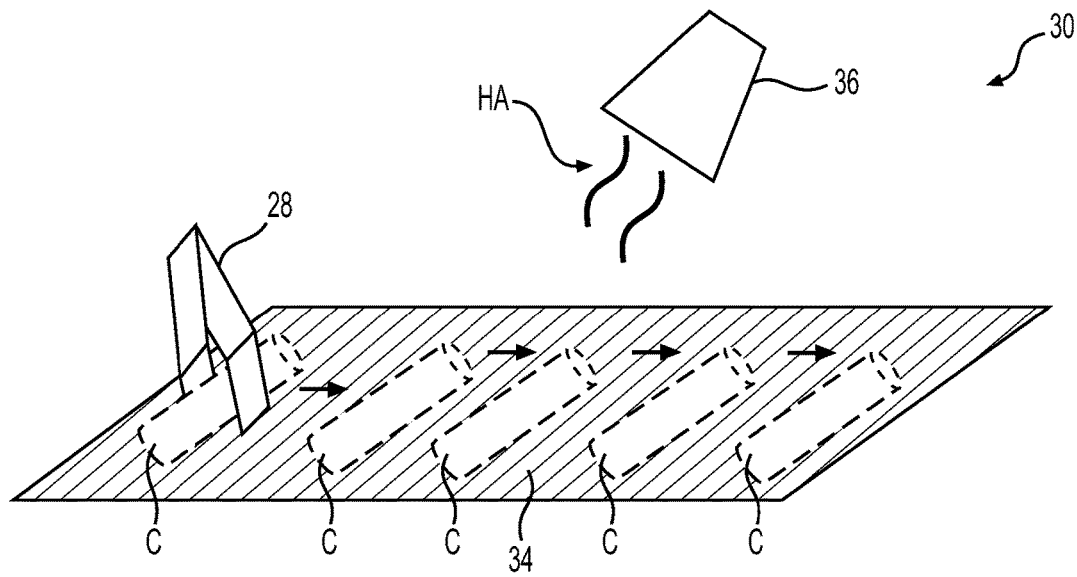
FIG. 3 diagrammatically illustrates drying and transport of the battery cell core at a drying and transport station of the system for separating battery components.
Figure 4:
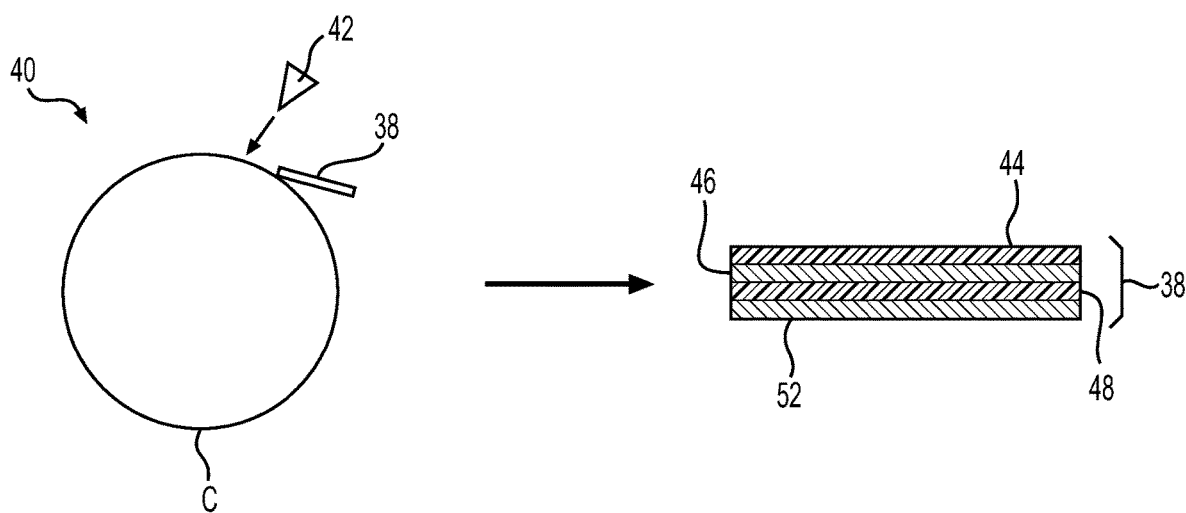
FIG. 4 diagrammatically illustrates cutting of an outer wrapping of the battery cell core at a cutting station of the system for separating battery components.
Figure 5A:
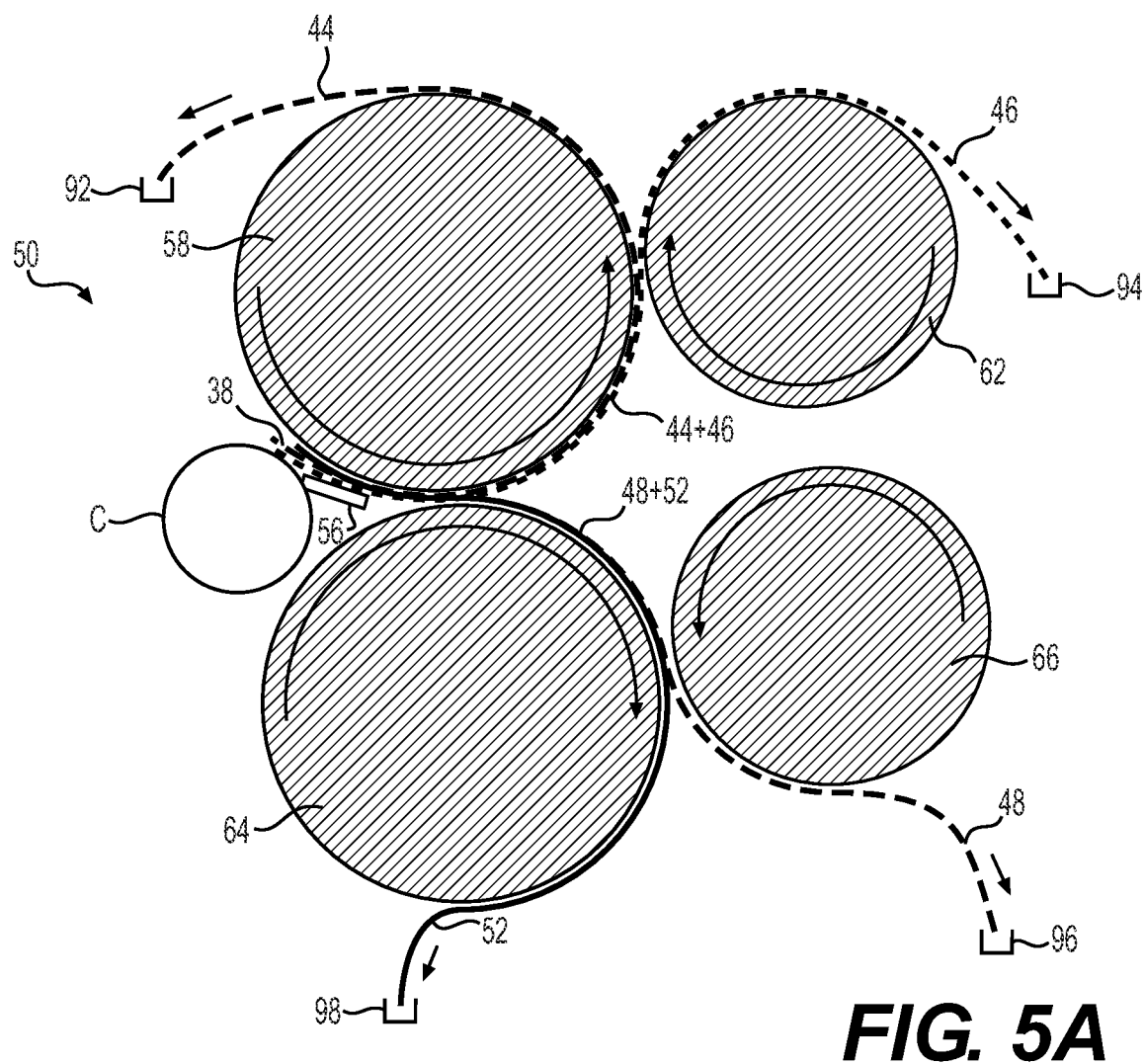
FIG. 5A diagrammatically illustrates unwrapping of the battery cell core, and separation thereof into individual layers at an unwrapping station of the system for separating battery components.

The washed battery cell core C is then removed from the washing reservoir 26 by a further clamp 28 (or, alternatively, by clamp 22) and is moved to a drying and transport station 30. As shown in FIG. 3, the drying and transport station 30 includes a conveyer belt 34 or the like for transporting the battery cell core C to a cutting station 40. In FIG. 3, conveyer belt 34 is shown as having corrugations or slots for holding battery cell core C, however, it should be understood that conveyer belt 34 is shown for exemplary purposes only, and may be any suitable type of transporter, such as any suitable type of conveyer belt, slide or the like. While being transported, the washed battery cell core C may be dried with hot air (HA) produced by a dryer 36, oven, heater or the like. As shown in FIG. 4, at the cutting station 40, a second cutter 42 cuts an outer wrapping layer of the battery cell core C to form an open loose end 38. As shown in FIG. 5A, a sheet opener 56 is provided for engaging the open loose end 38 of the battery cell core C to unroll a laminate therefrom.

The laminate, as shown in FIG. 4, may be formed from a cathode layer 52, an anode layer 46, a first polymer separator layer 44, and a second polymer separator layer 48. It should be understood that the particular sequence of first polymer separator layer 44, anode 46, second polymer separator layer 48 and cathode layer 52 may not be the same for all batteries, however, the preceding and following processes can still be applied.

Further, it should be understood that second cutter 42 is shown for exemplary and illustrative purposes only, and that any suitable type of cutter may be used. Non-limiting examples include knives, blades, lasers, localized flames, heated elements and the like. Ideally, at cutting station 40, only the outer wrapping layer is cut open by second cutter 42. However, it is possible that that one or more layers of cell core will be cut at the same time, particularly if a knife is used for cutting. Any small pieces that are cut off from the open loose end 38 of the cell core C cannot be recycled and will be collected in a separate tank. It should be understood that if an organic solvent is used in the washing reservoir 26/26' and the organic solvent dissolves the glue adhering the wrapping layer to the cell core C, such that an open loose end can be formed by this dissolving process, this cutting process performed by second cutter 42 can be skipped.

A plurality of rollers receive and selectively drive movement of the laminate. The plurality of rollers separate the laminate into the cathode layer 52, the anode layer 46, the first polymer separator layer 44, and the second polymer separator layer 48. It should be understood that any suitable arrangement and/or configurations of rollers may be used. In the non-limiting example of FIG. 5A, at unwrapping station 50, first and second rollers 58, 64, respectively, receive and selectively drive movement of the laminate. It should be understood that battery cell core C may be moved from cutting station 40 to unwrapping station 50 using any suitable method, such as conveyer belts, slides or the like. As the laminate passes through the first and second rollers 58, 64, with the laminate being sandwiched therebetween, the first and second rollers 58, 64 separate the laminate into a first sub-laminate including the first polymer separator layer 44 and the anode layer 46, and a second sub-laminate including the second polymer separator layer 48 and the cathode layer 52. The first sub-laminate is then sandwiched between the first roller 58 and a third roller 62 for separating the first sub-laminate into the first polymer separator layer 44 and the anode layer 46. The second sub-laminate is sandwiched between the second roller 64 and a fourth roller 66 for separating the second sub-laminate into the second polymer separator layer 48 and the cathode layer 52.

Figure 5B:
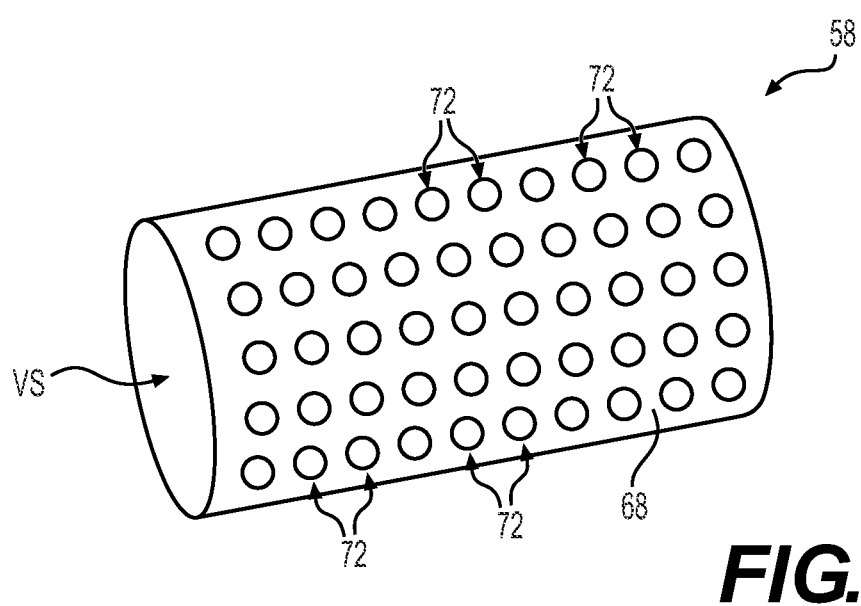
FIG. 5B is a perspective view of a roller used in the unwrapping station of FIG. 5A.
Figure 5C:
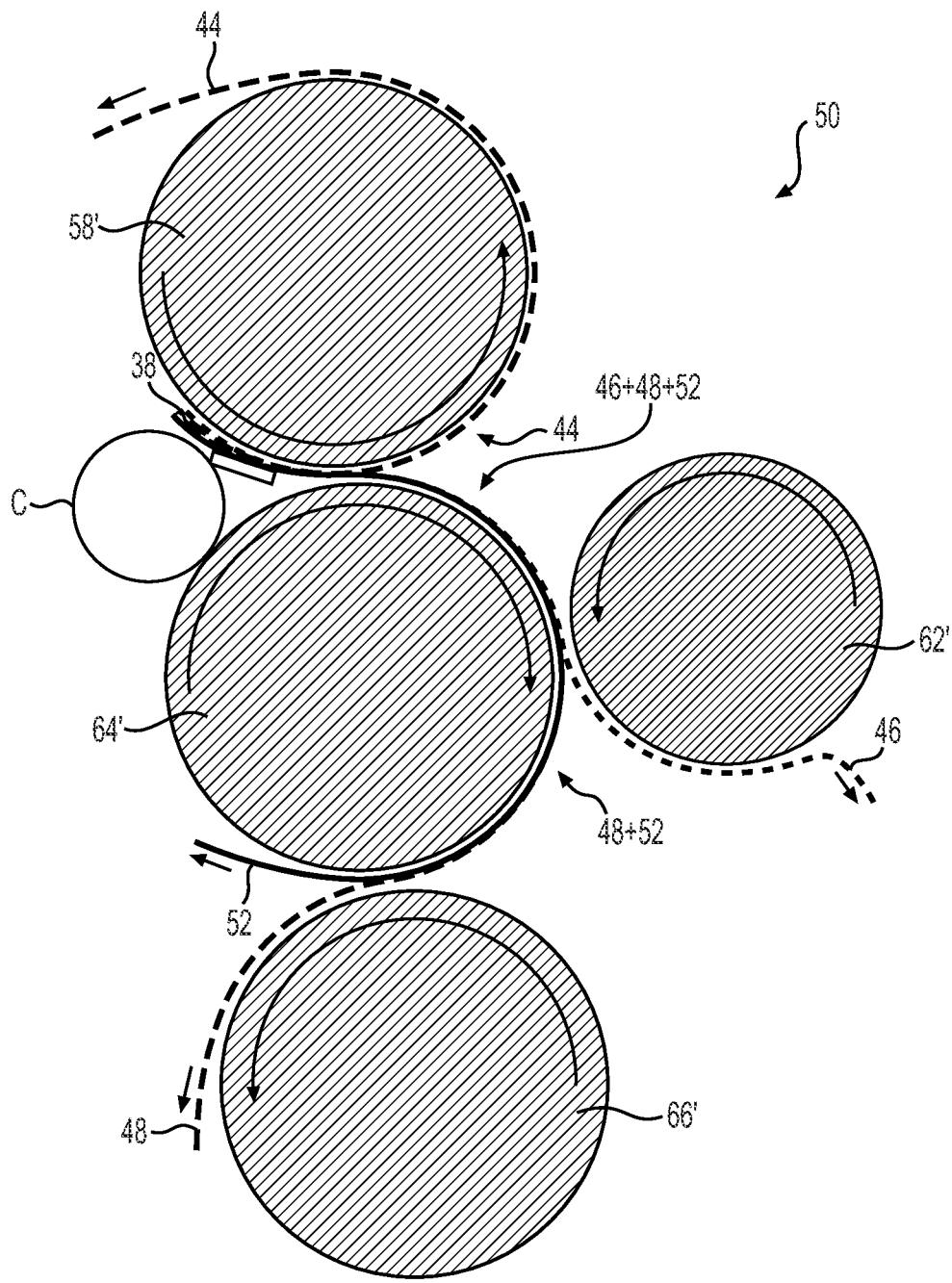
FIG. 5C diagrammatically illustrates an alternative embodiment of the unwrapping station of FIG. 5A.

In another non-limiting example, shown in FIG. 5C, the first and second rollers 58', 64', respectively, may separate the laminate into the first polymer separator layer 44 and an alternative first sub-laminate, which includes the anode layer 46, the second polymer separator layer 48 and the cathode layer 52. The first sub-laminate in this alternative arrangement is sandwiched between the second roller 64' and the third roller 62' for separating the first sub-laminate into the anode layer 46 and an alternative second sub-laminate, which includes the second polymer separator layer 48 and the cathode layer 52. The second sub-laminate is then sandwiched between the second roller 64' and the fourth roller 66' for separating the second sub-laminate into the second polymer separator layer 48 and the cathode layer 52. It should be understood that FIGS. 5A and 5C illustrate non-limiting examples only, and that any suitable arrangement or number of rollers may be used.

In both arrangements, in order to perform the separation of layers, each of the first, second, third and fourth rollers 58/58', 64/64', 62/62', 66/66', respectively, may be formed as a hollow cylindrical housing 68 having a plurality of apertures 72 formed therethrough. FIG. 5B illustrates only the first roller 58, however, it should be understood that each of the rollers may have a similar construction. Negative pressure or vacuum suction (VS) is applied within the hollow cylindrical housing 68, thus causing the layer of the laminate (or sub-laminate) adjacent the outer surface to be held thereagainst, peeling the closest layer from the remaining layer(s).

Figure 5D:
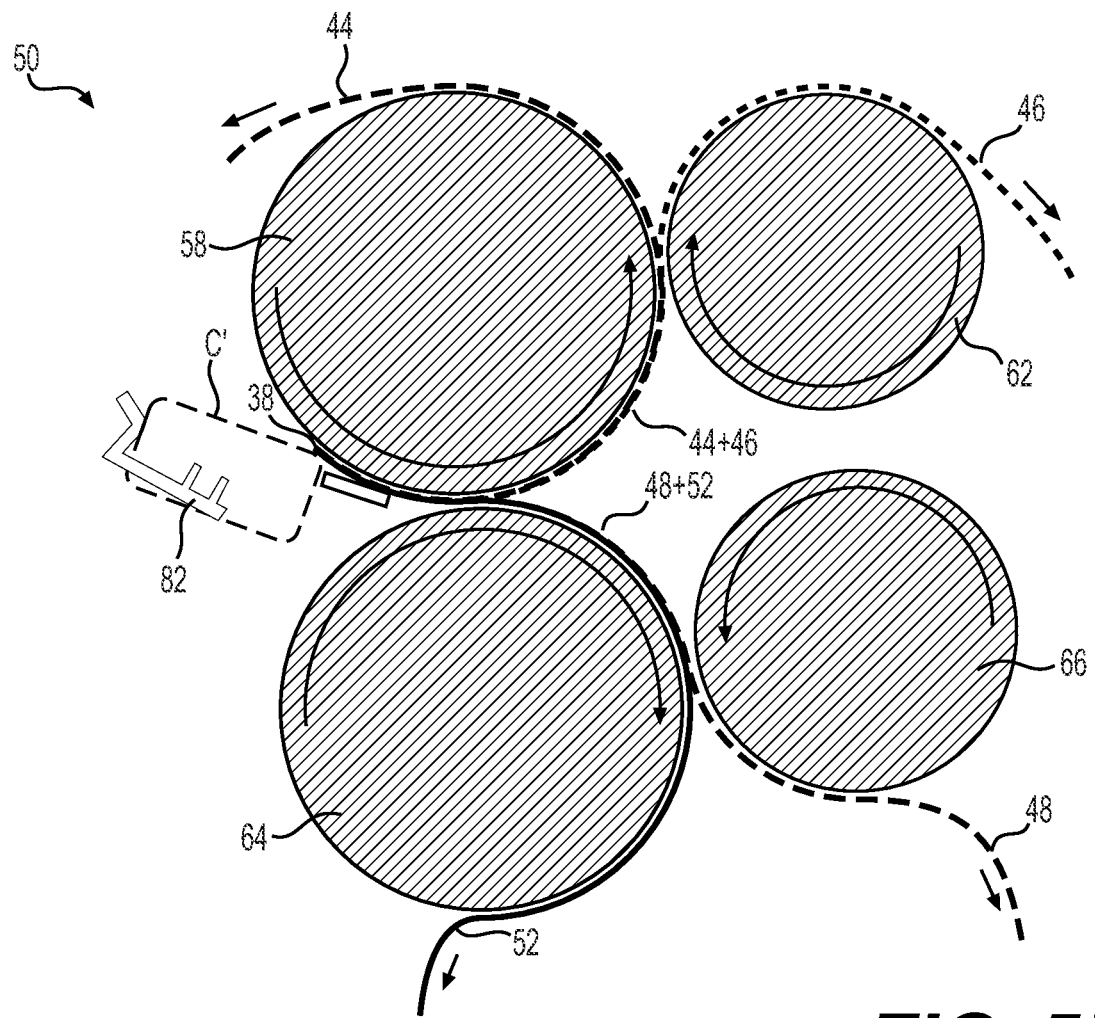
FIG. 5D diagrammatically illustrates another alternative embodiment of the unwrapping station of FIG. 5A.
Figure 6:
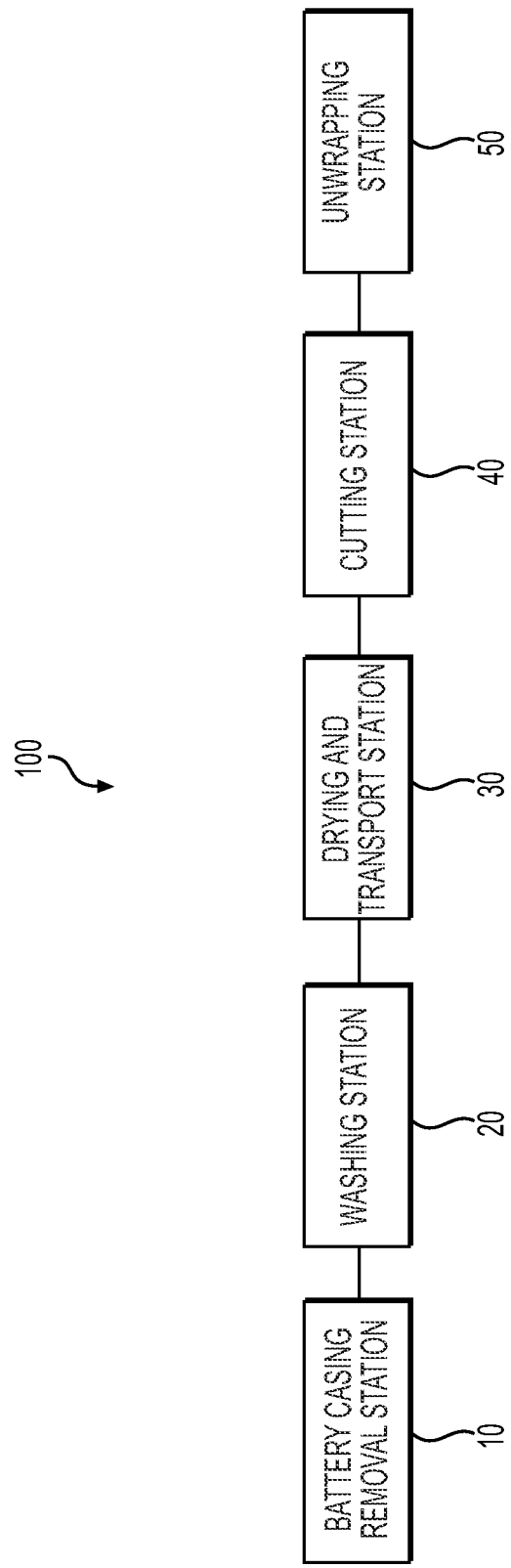
FIG. 6 is a block diagram showing the individual stations of the system for separating battery components.

Although FIGS. 5A, 5C and 5D show only one core C being unwrapped, it should be understood that more than one core C can be unwrapped at a time. Multiple cores, for example, can be aligned along their central longitudinal axis and be positioned axially parallel with the rollers, allowing the cores to all be unwrapped simultaneously.

Following separation of the individual layers, the cathode layer 52, the anode layer 46, the first polymer separator layer 44, and the second polymer separator layer 48 are collected, respectively, in a cathode layer collection box 98, an anode layer collection box 94, a first polymer separator layer collection box 92, and a second polymer separator layer collection box 96. Following separation by the vacuum rollers, each layer must be detached from its corresponding roller, thus, as a non-limiting example, each of the collection boxes 92, 94, 96, 98 may have a scraper or the like positioned adjacent thereto. Thus, prior to entering the collection box, the corresponding layer will be scraped from the surface of its roller as it enters the collection box. As a further non-limiting example, the apertures 72 of each roller can be selectively blocked, thus allowing the vacuum suction to be cut off at the portion of the roller where detachment of the layer from the roller surface is desired. Alternatively, or in addition to this blocking, outwardly directed pressurized air (or any other suitable type of fluid) may be blown from within the roller to detach the layer.

Further, in order to increase system reliability, such that a separated layer will not end up in the wrong collection box, a detection system may be installed to monitor the layers following their separation from the vacuum rollers. The detection system will detect whether the separated layer is a cathode, an anode, or a polymer separator layer, and directs the layer to the appropriate collection box. The detection system may be, as a non-limiting example, an image recognition system to observe the visual differences among the layers, an X-ray fluorescence spectroscopy system to differentiate the layers by material properties, or the like. Following detection, the separated layer can be transferred to its corresponding collection boxes by any suitable technique, such as, for example, a conveyer belt or the like. If system 100 is used solely for only one type of battery, or for a mixed source of batteries but with an identical arrangement of layers, then the detection system will not be necessary.

It should be understood that the above system and method may be applied to other types of batteries, and that cylindrical battery B is shown for exemplary purposes only. In the non-limiting example of FIG. 5D, the battery core C' of a cuboid battery is held by a core holder 82 adjacent to first and second rollers 58, 64. Once an open loose end, similar to open loose end 38, is formed, battery core C' may be unwrapped in a similar manner. It should be understood that core holder 82 may be allowed to rotate, or may be driven to rotate, to assist with the unwrapping of battery core C'.

Further, it should be understood that system 100 may be used with any suitable type of battery. For conventional lithium ion batteries, a liquid electrolyte is injected into the battery cell, but system 100 may also be used with batteries having solid phase electrolytes. In such batteries, instead of using a polymer separator, a solid phase electrolyte can be placed between a cathode layer and an anode layer. The three layers are wound up to form the cell core. System 100 can be adapted for separating the cell core into one layer of cathode, one layer of anode, and two layers of solid phase electrolyte, rather than two layers of polymer separator layer. For such a solid phase electrolyte, washing station 20 would not be necessary.

It is to be understood that the system and method for separating battery components is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A system for separating battery components, comprising:
    at least one clamp for grasping a battery;
    a first cutter for cutting a battery casing of the battery to uncover a battery cell core;
    a washing reservoir at least partially filled with a washing solution to remove an electrolyte from the battery cell core;
    a second cutter for cutting an outer wrapping layer of the battery cell core to form an open loose end;
    a sheet opener for engaging the open loose end of the battery cell core to unroll a laminate of the battery cell core, the laminate having a cathode layer, an anode layer, a first polymer separator layer, and a second polymer separator layer; and
    a plurality of rollers adapted for receiving and selectively driving movement of the laminate, the plurality of rollers separating the laminate into the cathode layer, the anode layer, the first polymer separator layer, and the second polymer separator layer.

2. The system for separating battery components as recited in claim 1, further comprising a battery holder adapted for receiving and holding the battery, the at least one clamp grasping the battery when the battery is seated in the battery holder.

3. The system for separating battery components as recited in claim 2, further comprising a loader coupled to the battery holder for transferring the battery to the battery holder.

4. The system for separating battery components as recited in claim 3, wherein the loader comprises a ramp.

5. The system for separating battery components as recited in claim 1, further comprising a drier for drying the battery cell core following washing thereof in the washing reservoir.

6. The system for separating battery components as recited in claim 1, further comprising:
    a cathode layer collection box for receiving the cathode layer;
    an anode layer collection box for receiving the anode layer;
    a first polymer separator layer collection box for receiving the first polymer separator layer; and
    a second polymer separator layer collection box for receiving the second polymer separator layer.

7. The system for separating battery components as recited in claim 1, wherein the plurality of rollers comprise:
    first and second rollers adapted for receiving and selectively driving movement of the laminate, the first and second rollers separating the laminate into a first sub-laminate comprising the first polymer separator layer and the anode layer, and a second sub-laminate comprising the second polymer separator layer and the cathode layer;

a third roller for separating the first sub-laminate into the first polymer separator layer and the anode layer; and a fourth roller for separating the second sub-laminate into the second polymer separator layer and the cathode layer.

8. The system for separating battery components as recited in claim 7, wherein each of the first, second, third and fourth rollers comprise a hollow cylindrical housing having a plurality of apertures formed therethrough, wherein, when negative pressure is applied within the hollow cylindrical housing, a corresponding one of the cathode layer, the anode layer, the first polymer separator layer, and the second polymer separator layer is held against an outer surface of the hollow cylindrical housing, the corresponding one of the cathode layer, the anode layer, the first polymer separator layer, and the second polymer separator layer being detached therefrom by at least partially blocking at least a portion of the plurality of apertures or by blowing a pressurized fluid through the plurality of apertures.

9. The system for separating battery components as recited in claim 1, wherein the plurality of rollers comprise:

first and second rollers adapted for receiving and selectively driving movement of the laminate, the first and second rollers separating the laminate into the first polymer separator layer and a first sub-laminate, the first sub-laminate comprising the anode layer, the second polymer separator layer and the cathode layer;

a third roller for separating the first sub-laminate into the anode layer and a second sub-laminate comprising the second polymer separator layer and the cathode layer; and a fourth roller for separating the second sub-laminate into the second polymer separator layer and the cathode layer.

10. The system for separating battery components as recited in claim 9, wherein each of the first, second, third and fourth rollers comprise a hollow cylindrical housing having a plurality of apertures formed therethrough, wherein, when negative pressure is applied within the hollow cylindrical housing, a corresponding one of the cathode layer, the anode layer, the first polymer separator layer, and the second polymer separator layer is held against an outer surface of the hollow cylindrical housing, the corresponding one of the cathode layer, the anode layer, the first polymer separator layer, and the second polymer separator layer being detached therefrom by at least partially blocking at least a portion of the plurality of apertures or by blowing a pressurized fluid through the plurality of apertures.

11. The system for separating battery components as recited in claim 1, further comprising a core holder adjacent the plurality of rollers for holding and rotating the battery cell core as the laminate is fed into the plurality of rollers.

12. The system for separating battery components as recited in claim 1, wherein the first cutter is selected from the group consisting of a knife, a laser cutter, a needle, a circular saw, a serrated edge, a water jet, an electrical discharge machine and combinations thereof.

13. The system for separating battery components as recited in claim 1, wherein the second cutter is selected from the group consisting of a knife, a blade, a laser, a localized flame, a heated element and combinations thereof.

14. The system for separating battery components as recited in claim 1, wherein the washing solution is selected from the group consisting of water, acid, an alkali solution, a sodium hydroxide solution, an aqueous salt solution, an organic solvent, benzyl alcohol, and combinations thereof.

15. The system for separating battery components as recited in claim 1, wherein the washing reservoir has a substantially wave-like shape, the battery cell core being inserted and extracted from the washing solution by at least one clamp.

16. The system for separating battery components as recited in claim 1, wherein the battery cell core is inserted, extracted from and moved through the washing solution by at least one clamp.

17. The system of separating battery components as recited in claim 1, further comprising a conveyer belt for transporting the battery cell core from the washing reservoir to the second cutter.

18. A method of separating battery components, comprising the steps of:

cutting a battery casing of a battery to uncover a battery cell core;

washing the battery cell core to remove an electrolyte therefrom;

cutting an outer wrapping layer of the battery cell core to form an open loose end;

engaging the open loose end of the battery cell core with first and second rollers to unroll a laminate of the battery cell core, wherein the laminate includes a cathode layer, an anode layer, a first polymer separator layer, and a second polymer separator layer;

separating the laminate into the cathode layer, the anode layer, the first polymer separator layer, and the second polymer separator layer with the first roller, the second roller, a third roller, and a fourth roller;

collecting the cathode layer;

collecting the anode layer;

collecting the first polymer separator layer; and collecting the second polymer separator layer.

19. The method of separating battery components as recited in claim 18, further comprising the steps of:

loading the battery into a battery holder prior to the step of cutting the battery casing; and drying the battery cell core following the step of washing the battery cell core.

20. The method of separating battery components as recited in claim 18, wherein the step of cutting the battery casing of the battery is performed in an inert gas environment.

* * * * *